United States Patent
Casper et al.

(10) Patent No.: US 6,506,281 B1
(45) Date of Patent: Jan. 14, 2003

(54) METHOD FOR ISOLATING POLYMERS FROM SOLUTIONS

(75) Inventors: Clemens Casper, Krefeld (DE); Jörgen Weinschenck, Krefeld (DE); Klemens Kohlgrüber, Kürten (DE); Jürgen Heuser, Krefeld (DE); Christian Kords, Krefeld (DE); Thomas Elsner, Düsseldorf (DE)

(73) Assignee: Bayer Aktiengesellschaft, Leverkusen (DE)

(*) Notice: Subject to any disclaimer, the term of this patent is extended or adjusted under 35 U.S.C. 154(b) by 0 days.

(21) Appl. No.: 09/719,891

(22) PCT Filed: Jun. 11, 1999

(86) PCT No.: PCT/EP99/04023

§ 371 (c)(1),
(2), (4) Date: Mar. 2, 2001

(87) PCT Pub. No.: WO99/67002

PCT Pub. Date: Dec. 29, 1999

(30) Foreign Application Priority Data

Jun. 23, 1998 (DE) .......................... 198 27 852

(51) Int. Cl.⁷ ............................. B01D 1/22; B01D 3/06; C08G 64/40

(52) U.S. Cl. ........................... 159/49; 159/2.3; 159/6.2; 159/13.2; 159/28.4; 159/26.1; 159/DIG. 8; 159/DIG. 10; 528/501

(58) Field of Search ................................. 159/47.1, 2.3, 159/6.2, DIG. 10, 49, 26.1, 28.4, 14, 15, 13.2, 27.2, DIG. 16, DIG. 8, 45; 203/88, 71, 91; 202/205; 528/501

(56) References Cited

U.S. PATENT DOCUMENTS 3,279,893 A * 10/1966 Sikorsk ..................... 23/285
3,550,669 A   12/1970 Lippert et al. ............... 159/6
3,558,282 A *  1/1971 Evans ......................... 23/285
3,834,441 A    9/1974 Vernaleken et al. .......... 159/49
6,069,228 A *  5/2000 Alsop et al. ................. 528/310

FOREIGN PATENT DOCUMENTS

EP  0 045 912   2/1982
EP  0 352 727   1/1990
RO     90303  * 10/1986

OTHER PUBLICATIONS

Casper et al, "Multiphase spiral tube as high–performance mass exchanger", Doc. #125:171815.*

* cited by examiner

*Primary Examiner*—Virginia Manoharan
(74) *Attorney, Agent, or Firm*—Joseph C. Gil; Aron Preis; James R. Franks

(57) ABSTRACT

A process of evaporating a viscous polymer solution is described. The process includes: (a) providing a viscous polymer solution including at least 30 wt. % of solvents and monomers; (b) introducing the viscous polymer solution into a heated helix (5), the heated helix having a vapor exit velocity of 200 to 300 m/s, (a film flow including a two-phase mixture of polymer melt, and solvent vapors and monomer vapors being formed within the helix); (c) forwarding the film flow from helix (5) into a heated vapor separator (6); (d) expanding the two-phase mixture of polymer melt, and solvent vapors and monomer vapors of the film flow within vapor separator (6) at an absolute pressure of 10 mbar to 800 mbar, (a bottom product including a concentrated melt of the polymer is formed within the vapor separator); and (e) withdrawing the bottom product from vapor separator (6). Each of the helix (5) and vapor separator (6) have a separate heating device, and each of heating device independently provides a temperature that is above the softening point of the polymer.

9 Claims, 3 Drawing Sheets

METHOD FOR ISOLATING POLYMERS FROM SOLUTIONS

FIELD OF THE INVENTION

The invention is based on a process for the evaporation of a polymer solution, wherein the polymer solution flows through a heated helix and a vapor separator connected thereto.

BACKGROUND OF THE INVENTION

In the manufacture of polymers in solution, a solution is obtained after the reaction. While maintaining a high product quality, the polymer has to be isolated from this solution in such a way as to minimize the residual solvent content of the end product. This necessitates solving a number of partial problems, which often demand diametrically opposed measures.

The pure polymer has a softening point which is often well above the boiling point of the solvent. As the boiling point of the solution is close to the boiling point of the solvent up to high polymer concentrations because of the very large molecular weight difference between polymer and solvent, the solution viscosity during the process initially increases sharply and can reach values well above 1000 Pas, which results in a poor heat transfer, requires large mixing forces and can lead to the temperature falling short of the glass transition temperature. Only in the final phase of the process, when the proportion of polymer has a substantial influence on the vapor pressure of the solution, does the solution temperature rise sharply and exceed the softening point of the polymer, which becomes noticeable as a drop in the viscosity. Towards the end of the process, the convective evaporation process changes to a diffusion process. This phase demands a prolonged residence time, a large exchange area, thorough mixing of the viscous product and a high partial pressure gradient.

The majority of products are very heat-sensitive, i.e. from this point of view they require a low temperature level and short residence times.

There have so far been two basic processes for achieving the object:

1. The solution is heated during spray drying and then atomized into a drying tower or an agglomerating tube with the aid of stripping steam. The solvent is evaporated off in this process to give a powder which is substantially solvent-free but enriched with condensate. This normally requires afterdrying. The main disadvantage of this process is the high cost in terms of energy and equipment.

2. The evaporation process uses a combination of evaporator types connected in series. An example of a known combination is: falling-film evaporator (pre-evaporation to 20 wt. % of polymer)+film evaporator (main evaporation to 50 wt. % of polymer)+double-shaft screw machine (residual evaporation to 500 $\mu$g/g of residual solvent).

The combination multiphase helix+double-shaft screw machine has frequently been used in recent times. The multiphase helix, which is described in greater detail in patents DE 1 667 051 and DE 1 921 045, is based essentially on a flash evaporation and a downstream evaporation in the indirectly heated helix. A vapor separator is added downstream of the helix. To avoid excessively high viscosities, which can result in clogging of the tube, the process is carried out under positive pressure, which raises the temperature level and hence lowers the viscosity to the point where the danger of clogging is averted. On the other hand, the residence time of the product in the flow tube is so short that no product damage occurs. In this way the starting solution can generally be concentrated to 70 to 90 wt. % in one pass. The molar proportion of solvent, even at high polymer concentrations near the end of the tube, is still large enough for convection and not diffusion to dominate the evaporation process at this point. The high degree of concentration relieves the downstream screw machine, resulting in a lowering of the residual solvent content of the end product. The main disadvantages of this process are the high investment costs for the screw machine, the wear on the rotating parts, the many seals, especially those of the vapor domes, their susceptibility to failure because of the rotating parts, and the handling of the heavy machine parts.

SUMMARY OF THE INVENTION

The object of the invention is, during the concentration of polymers, to reduce the residual solvent or monomer content at least to the limiting value of less than 1 wt. % allowed by law, and at the same time to replace the expensive process engineering applied hitherto with simpler methods which can be carried out with inexpensive equipment.

This object is achieved according to the invention by a process for the evaporation of a polymer solution, wherein the polymer solution, which in the initial composition contains at least 30 wt. % of solvents and monomers, preferably 50 to 70 wt. %, is passed at a high flow velocity through a heated helix and a heated vapor separator connected thereto, characterized in that the temperatures of the heating means in the helix and the separator are above the softening point of the polymer and in that the two-phase mixture of polymer melt and solvent vapors and monomer vapors, formed in the helix, is expanded into the heated vapor separator to an absolute pressure in the range 10 mbar to 800 mbar.

DETAILED DESCRIPTION OF THE INVENTION

Figure 1:
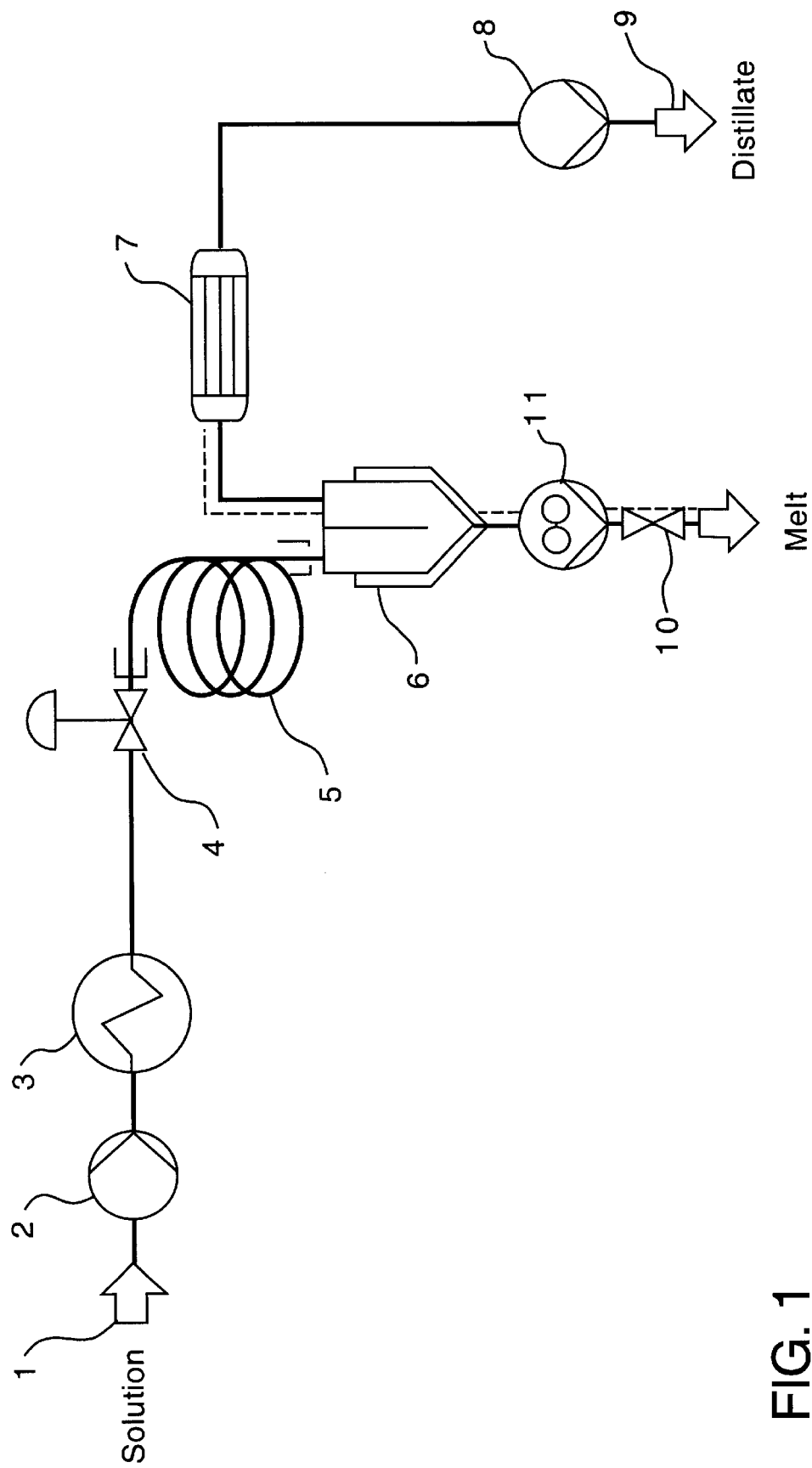
FIG. 1 is a representative flow diagram of a one-stage continuous polymer evaporation system used in the method of the present invention, which includes a helix with a downstream vapor separator and discharge means.

Advantageously the temperature of the heating means in the helix and the separator is kept at a value which is 10% to 30% above the polymer glass transition temperature.

Advantageously the process is also carried out in such a way that the polymer solution is at a pressure of between 4 bar and 20 bar on entering the helix.

A development of the invention for achieving even lower residual solvent contents consists in evaporating the polymer solution even further, down to a residual solvent content of 5 $\mu$g/g to 100 $\mu$g/g, in a strand evaporator downstream of the separator.

If the proportion of polymer in the starting solution is very low (<30 wt. %), two or more multiphase helix stages can be connected in series. If the throughput is very high (>5 t/h of polymer), two or more multiphase helix stages can be connected in parallel, it being necessary for each stage to be equipped with its own pumping system.

For further processing of the concentrated polymer, the bottom product in the separator, consisting of the polymer melt, is expediently drawn off by means of a wide-mouthed gear pump or a conveying screw and then converted to a solid granulated form in a cooling device.

The process according to the invention is suitable for thermoplastics such as polycarbonates, polyester-carbonates, polyalkylene terephthalates, terpolymer elastomers prepared from ethylene-propylene diene monomer (EPDM polymers), polystyrene and copolymers and graft copolymers prepared on the basis of styrene, acrylonitrile and butadiene, e.g. ABS, but is also suitable for other polymers such as inorganic silicones.

The great advantage of the process according to the invention is that it dispenses with the investment and operating costs of the otherwise conventional expensive machines. Coupled with this are not only lower operating and investment costs, but also a reduction in the thermal and mechanical stress on the product, resulting in a higher product quality. If the specification is above 0.1 wt. %, the multiphase helix together with the separator is sufficient to achieve the object. However, if the required specification is below 0.1 wt. %, the strand evaporator is added downstream.

The invention is based on the following knowledge:

In a number of experimental studies it was found, surprisingly, that polymer solutions can be concentrated in the multiphase helix to residual solvent and monomer contents of less than 1 wt. % without clogging or product damage occurring. This is achieved by high temperatures of the heating means above the softening point of the polymers, which prevents the polymers from sticking to the wall and from possibly initiating clogging in the tube and product damage, by high flow velocities in the helix, which can reach the speed of sound and hence ensure a high pressure level and large wall shear forces, and by a subsequent expansion evaporation into the evacuated separator. The temperature of the heating means in the separator, above the glass transition temperature, ensures a reliable discharge of the viscous product out of the system when using a heated discharge pump or a conveying screw as the discharge means, it also being necessary for the temperatures of the heating means to be above the glass transition temperature in said discharge means. Under these conditions the residual solvent content of the polymer in the multiphase helix can reliably and reproducibly be reduced to below 1 wt. %.

The invention is described in greater detail below with the aid of Examples and drawings.

The process is illustrated here using the evaporation of a polycarbonate solution (PC solution) as an example. As shown in FIG. 1, the PC solution 1 to be concentrated is pumped by the pump 2 through a heat exchanger 3, expanded in the valve 4 and then flows through a helix 5 and a downstream vapor separator 6 consisting of a commercially available cyclone separator. Both the helix 5 and the vapo[u]r separator 6 are provided with a heating jacket through which a heating means or heat transfer medium, e.g. Diphyl THT, flows. A film flow forms in the helix 5 due to the composition of the vapor/liquid mixture, the pressure gradient and the high temperatures, it being possible for the vapor at the end of the tube to reach flow velocities of 200 m/s to 300 m/s. The vapors separated off in the vapor separator 6 are condensed in the condenser 7 and drawn off as distillate 9 by means of the pump 8. The concentrated polycarbonate melt 10 remains in the vapour separator 6 as the liquid phase and is fed by means of a discharge pump 11, also heated, into a buffer container or optionally into further process stages. The discharge pump can consist of a wide-mouthed gear pump or a conveying screw.

The helix 5 had an internal diameter of 15 mm, a length of 6 m, a mean helical diameter of 284 mm and a helical pitch of −5.7. The internal surface area of the helix was 0.29 m$^2$. This set-up was used to perform experiments with throughputs of 35 to 85 kg/h of PC solution. The temperature of the PC solution downstream of the heat exchanger was 180° C. at a pressure of 19 bar. On entering the helix 5, the PC solution is expanded to 3 to 8 bar by means of the valve 4. The temperature at this point was 150° C. to 180° C. On entering the heated vapor separator 6, the two-phase mixture consisting of PC melt and solvent vapor, formed in the helix 5, was expanded to an absolute pressure of 10 mbar to 800 mbar. In this expansion evaporation, large amounts of vapor are again released abruptly. On leaving the vapor separator 6, the PC melt had a concentration of 98.1 to 99.85 wt. % at a temperature of 240° C. to 260° C. The temperature of the heating means (i.e. the temperature of the heat transfer medium in the heating circuit of the helix 5 and the vapor separator 6) was 300° C.

Figure 2:
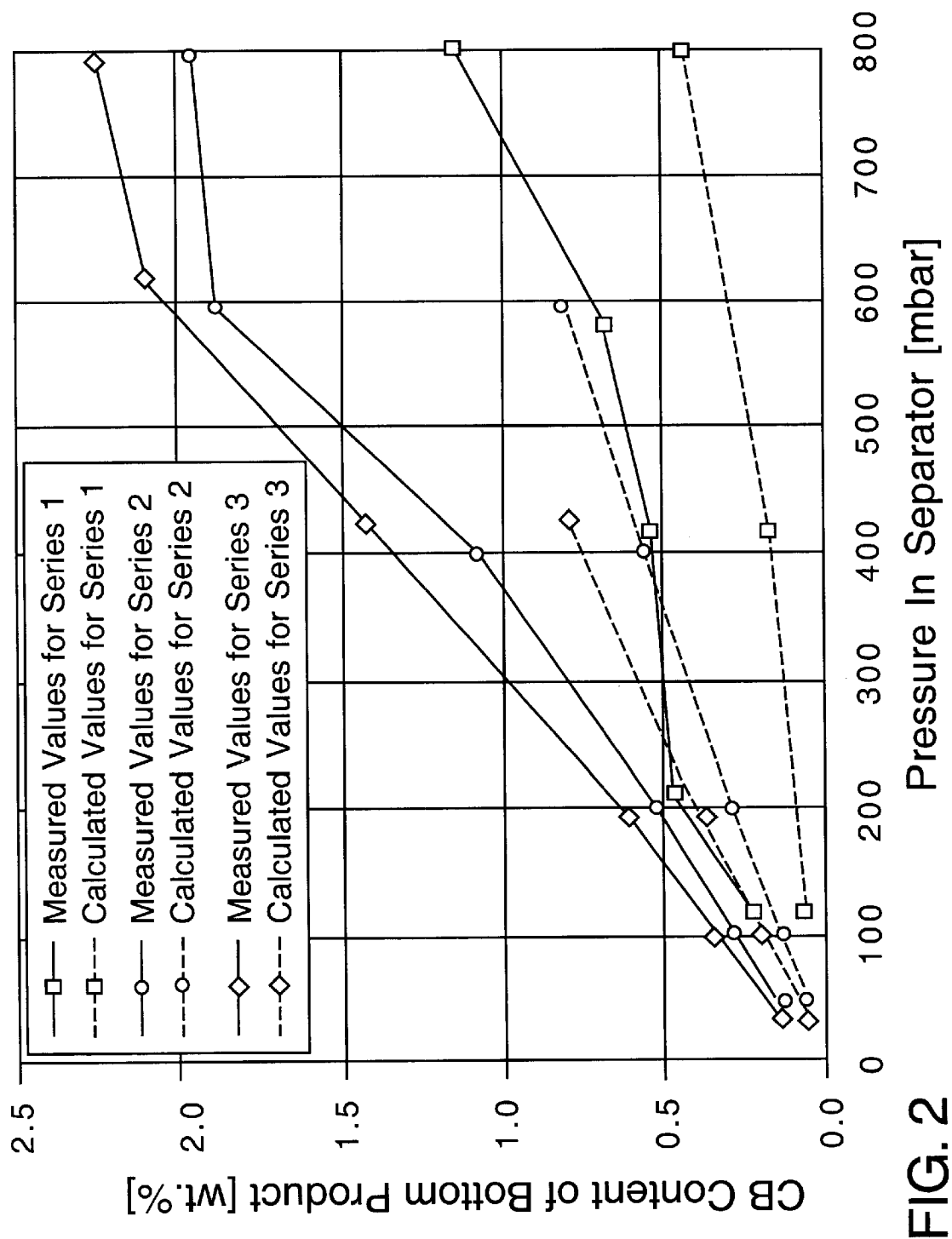
FIG. 2 is a graphical representation of the experimental residual chlorobenzene content of concentrated polycarbonate for different series of experiments and, by way of comparison, the residual chlorobenzene contents established under the experimental conditions in the phase equilibrium state as a function of the pressure in the separator.

The boundary conditions for three series of experiments using this set-up are collated in tabular form below and the results are shown in the graph of FIG. 2. The individual series of experiments differ in the composition of the starting solution. In each series of experiments the system pressure in the separator 6 was varied between 10 and 1000 mbar. The pressure upstream of the nozzle is 19 bar and the pressure downstream of the nozzle is 3 to 5 bar. The pressure losses in the tube are given by the difference between the pressure downstream of the nozzle and the system pressure.

1st Series of Experiments

PC solution:

| | |
|---|---|
| Composition of the solution | 14 wt. % of PC |
| | 43 wt. % of chlorobenzene |
| | 43 wt. % of dichloromethane |
| Throughput | 43 kg/h |
| Temperatures: | |
| Heating of heat exchanger 3 | 200° C. (heat transfer medium: steam) |
| Heating of helix 5 | 300° C. (heat transfer medium: Diphyl THT) |
| Heating of separator 6 and discharge pump 11 | 290° C. (heat transfer medium: Diphyl THT) |

2nd Series of Experiments

PC solution:

| | |
|---|---|
| Composition of the solution | 30 wt. % of PC |
| | 60 wt. % of chlorobenzene |
| | 10 wt. % of dichloromethane |
| Throughput | 38 kg/h |
| Temperatures: | |
| Heating of heat exchanger 3 | 200° C. (heat transfer medium: steam) |
| Heating of helix 5 | 300° C. (heat transfer medium: Diphyl THT) |
| Heating of separator 6 and discharge pump 11 | 290° C. (heat transfer medium: Diphyl THT) |

3rd Series of Experiments

PC solution:

| | |
|---|---|
| Composition of the solution | 14 wt. % of PC |
| | 86 wt. % of chlorobenzene |
| Throughput | 40 kg/h |
| Temperatures: | |
| Heating of heat exchanger 3 | 200° C. (heat transfer medium: steam) |
| Heating of helix 5 | 300° C. (heat transfer medium: Diphyl THT) |
| Heating of separator 6 and discharge pump 11 | 290° C. (heat transfer medium: Diphyl THT) |

FIG. 2 shows the residual contents of solvent (chlorobenzene) in the bottom product discharged from the helix 5, said contents being measured with the help of an analysis. The theoretically calculated equilibrium values, i.e. the values below which the solvent contents cannot fall under the given boundary conditions, are also plotted on this graph.

If even more stringent demands are made on the absence of solvent in the polycarbonate, a strand evaporator can be added downstream of the separator 6 or the discharge pump 11 as a further evaporator stage. Residual solvent contents of less than 0.1 wt. % can be achieved with a combination of this type.

Figure 3:
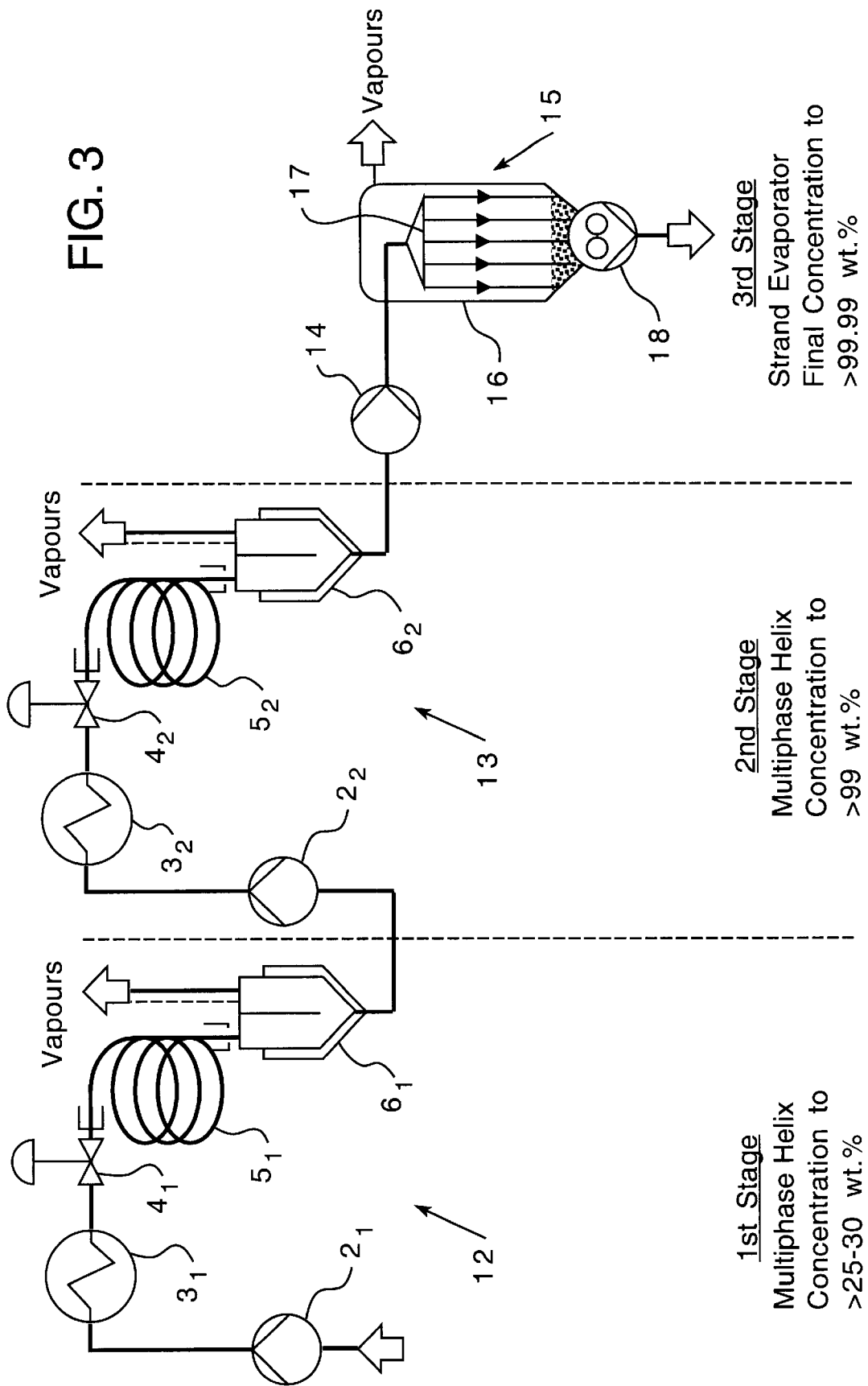
FIG. 3 is a representative flow diagram of a three-stage continuous polymer evaporation used in the method of the present invention, which includes two helix stages each with vapor separators, and a downstream strand evaporator.

FIG. 3 shows a flow diagram of a multistage helix evaporator set-up with vapor separators in combination with a strand evaporator as the last stage. The two successive multiphase helix stages 12 and 13 are constructed completely analogously to the set-up of FIG. 1 and consist of the pumps 21 and 22, the heat exchangers 31 and 32, the valves 41 and 42, the multiphase helices 51 and 52 and the vapor separators 61 and 62. The outlet of the second vapor separator 62 is connected via a discharge pump 14 to a strand evaporator 15 belonging to the state of the art. The strand evaporator is a diffusion apparatus capable of producing a large exchange area for the product. It consists substantially of an evacuated container 16 equipped with a nozzle plate 17 at the top end and a discharge means 18 at the bottom end. The nozzle plate 17 produces threads of product melt, which fall down through the container 16 and are then drawn off by the discharge means 18 as product melt. As the threads are falling, the residual solvent evaporates by diffusing out of the product. The residual solvent content can thus be reduced by a further one to two orders of magnitude.

On entering the first helix $5_1$, the PC solution is at a temperature of 200° C. A pressure of 2 bar prevails in the separator $6_1$. The polycarbonate concentration $c_p$ is 30 wt. %. In the second stage the temperature in the helix $5_2$ is 300° C. and the pressure in the separator $6_2$ is less than 0.1 bar. The $c_p$ value is over 99 wt. %. In the third stage a vacuum of 1 mbar and a temperature of 300° C. prevail in the strand evaporator 15. Downstream of the discharge means 18 the $c_p$ value after final concentration is over 99.9 wt. %. Concentration in the first helix stage 12, in the second helix stage 13 and in the strand evaporator stage normally gives $c_p$ values of 25 to 30 wt. %, more than 99 wt. % and more than 99.99 wt. % respectively. In the case of very low throughputs per nozzle bore, e.g. below 100 g/l, residual solvent contents of less than 10 ppm are achieved in the strand evaporator.

The evaporation or concentration is normally followed by yet another process step for cooling and solidifying the polymer melt. For this purpose the hot polymer melt is drawn off from the vapor separator 6 in the embodiment of FIG. 1, and from the strand evaporator 15 in the embodiment of FIG. 3, by means of a gear pump with a large feed area or by means of a conveying screw constructed as a collecting pump, and is then transferred as a thin layer onto a cooling belt or a cooling roller, where it solidifies to a film or sheet of product.

Further Example

The same experimental set-up was used to study the concentration of a cyclo-propanecarboxamide (CP-amide)/isobutanol solution. The boundary conditions were as follows:

Throughput: 15.9 kg/h

Proportion of isobutanol in starting solution: 44 wt. %

Melting point of CP-amide: 120° C.

Heating means: steam

Temperature of heating means in heat exchanger 3: 150° C.

Temperature of heating means in helix 5: 150° C.

Temperature of heating means in separator 6: 150° C.

Pressure upstream of nozzle 4: 11 $bar_{abs}$

Pressure in separator 6: 10 $bar_{abs}$

Result: 0.1 wt. % of isobutanol in the discharge 10

What is claimed is:

1. A process of evaporating a viscous polymer solution comprising:
    (a) providing a viscous polymer solution comprising at least 30 wt. % of solvents and monomers;
    (b) introducing said viscous polymer solution into a heated helix, said heated helix having a vapor exit velocity of 200 to 300 m/s,
        a film flow comprising a two-phase mixture of polymer melt, and
        solvent vapors and monomer vapors being formed within said helix;
    (c) forwarding said film flow from said helix into a heated vapor separator;
    (d) expanding the two-phase mixture of polymer melt, and solvent vapors and monomer vapors of said film flow within said vapor separator at an absolute pressure of 10 mbar to 800 mbar,
        a bottom product comprising a concentrated melt of said polymer being formed within said vapor separator; and
    (e) withdrawing said bottom product from said vapor separator,
wherein each of said helix and said vapor separator have a separate heating means, and each of said heating means of said helix and said vapor separator independently have a temperature above the softening point of the polymer.

2. The process of claim 1 wherein said polymer has a glass transition temperature, and the temperature of the heating means of each of said helix and said separator is independently kept at a value which is 10% to 30% above the glass transition temperature of said polymer.

3. The process of claim 1 wherein the viscous polymer solution is kept at a pressure of between 4 bar and 20 bar upon its introduction into said helix.

4. The process of claim 1 further comprising (f) forwarding the withdrawn bottom product of step (e) to a strand evaporator, and (g) removing from said strand evaporator polymer having a residual solvent content of 5 µg/g to 500 µg/g.

5. The process of claim 1 wherein said viscous polymer solution contains less than 30 wt. % of polymer, and said process further comprises forwarding the withdrawn bottom product of step (e) to at least one further multiphase helix stage connected in series with said separator.

6. The process of claim 1 wherein when said process has a throughput of more than 5 t/h, at least two multiphase helix stages are provided connected in parallel, each multiphase helix stage comprising said heated helix, said heated vapor separator and a pumping system, a portion of said viscous polymer solution being introduced Into the heated helix of each parallel multiphase helix stage.

7. The process of claim 1 wherein the bottom product is withdrawn from separator by means of a discharge pump, said process further comprising converting the withdrawn bottom product to a solid granulated form in a cooling device.

8. The process of claim 1 wherein said viscous polymer solution comprises 50 to 70 wt. % of solvents and monomers.

9. The process of claim 1 wherein the polymer of said viscous polymer solution is selected from at least one of polycarbonates, polyester-carbonates, polyalkylene terephthalates, terpolymer elastomers prepared from ethylene-propylene diene monomer, polystyrene, copolymers of styrene and acrylonitrile, and graft copolymers prepared from styrene, acrylonitrile and butadiene, and inorganic silicones.

* * * * *